United States Patent
Jihoon et al.

(10) Patent No.: US 9,625,561 B2
(45) Date of Patent: Apr. 18, 2017

(54) METHOD AND APPARATUS FOR DETERMINING A POSITION OF USER EQUIPMENT, AND AN ANTENNA SET THEREFOR

(71) Applicant: Telefonaktiebolaget L M Ericsson (publ), Stockholm (SE)

(72) Inventors: Lee Jihoon, Seoul (KR); Kim Junghoon, Gyeonggi-do (KR); Lee Konju, Gyeonggi-do (KR)

( * ) Notice: Subject to any disclaimer, the term of this patent is extended or adjusted under 35 U.S.C. 154(b) by 1020 days.

(21) Appl. No.: 13/872,025

(22) Filed: Apr. 26, 2013

(65) Prior Publication Data

US 2014/0320337 A1 Oct. 30, 2014

(51) Int. Cl.
| G01S 1/44 | (2006.01) |
| G01S 3/58 | (2006.01) |
| G01S 1/12 | (2006.01) |
| G01S 1/58 | (2006.01) |
| G01S 1/14 | (2006.01) |

(52) U.S. Cl.
CPC ............ *G01S 1/44* (2013.01); *G01S 1/12* (2013.01); *G01S 1/58* (2013.01); *G01S 3/58* (2013.01); *G01S 1/14* (2013.01)

(58) Field of Classification Search
CPC ..... G01S 1/10; G01S 1/12; G01S 1/44; G01S 3/58
See application file for complete search history.

(56) References Cited

U.S. PATENT DOCUMENTS

| 2,194,548 | A | * | 3/1940 | Hammond, Jr. | .......... G01S 1/02 342/398 |
| 4,148,034 | A | * | 4/1979 | Cooney | ...................... G01S 1/40 342/402 |
| 4,916,451 | A | * | 4/1990 | Ishita | ........................ G01S 1/56 342/173 |
| 5,859,612 | A | | 1/1999 | Gilhousen | |
| 2004/0257274 | A1 | | 12/2004 | Benco et al. | |
| 2005/0070266 | A1 | | 3/2005 | Senarath et al. | |
| 2008/0303717 | A1 | * | 12/2008 | Durban | ..................... G01S 1/44 342/371 |
| 2010/0323717 | A1 | | 12/2010 | Agashe et al. | |

FOREIGN PATENT DOCUMENTS

JP 2006220620 A 8/2006

OTHER PUBLICATIONS

International Preliminary Report on Patentability (Chapter I), Application No. PCT/SE2014/050466, dated Nov. 5, 2015, 9 pages.
International Search Report and Written Opinion, Application No. PCT/SE2014/050466, dated Sep. 5, 2014, 11 pages.
Extended European Search Report for European Application No. 14788875, mailed Feb. 3, 2017, 7 pages.

* cited by examiner

*Primary Examiner* — Gregory C Issing
(74) *Attorney, Agent, or Firm* — Nicholson De Vos Webster & Elliott, LLP

(57) ABSTRACT

There is provided a method for positioning of user equipment. The method for positioning of user equipment, includes: receiving, by the user equipment, a signal from an external antenna, the signal being radiated in a cyclic pattern; measuring, by the user equipment, strength of the received signal, characterizing, by the user equipment, the measured strength to form a signal pattern over a time period; and determining a position of the user equipment based on the signal pattern.

12 Claims, 11 Drawing Sheets

METHOD AND APPARATUS FOR DETERMINING A POSITION OF USER EQUIPMENT, AND AN ANTENNA SET THEREFOR

TECHNICAL FIELD

The present disclosure generally relates to positioning, and more particularly to a method and an apparatus for determining a position of user equipment using an antenna set radiating a signal in a cyclic rotation pattern.

BACKGROUND

Positioning technologies have been developed to provide various services such as navigation, traffic information, a rescue request, a crime report response, a location based customer relationship management, and the like. A global positioning system (GPS) is typically used as the positioning technologies.

It is required to locate user equipment, such as a mobile terminal or the like, in order to use the location based service. However, the location based service, which uses the GPS satellites, cannot provide location information of the user equipment at regions that GPS satellite signals are weak (e.g., such as indoor environments, tunnels, underground parking places, downtown areas and the like).

To cope with the drawback of the GPS based positioning system, indoor positioning solutions, such as Wi-Fi based solutions, cellular based solutions and the like, have been recently introduced. However, a Wi-Fi based positioning system requires at least three Wi-Fi access points for allowing triangulation to estimate a location of the user equipment. Thus, the Wi-Fi based positioning system relies on access to Wi-Fi access points, so that it may not be available in certain locations.

Many cellular based solutions, such as Cell of Origin, Time of Arrival (TOA), Angle of Arrival (AOA) and the like, are employed to provide the location based services. However, the cell of origin based positioning system may provide poor accuracy because it depends on a cell size. Also, the TOA based positioning system and the AOA based position system may lead to privacy concerns because the calculation for estimating the location of the user equipment is performed in the mobile network system. Further, these cellular based position systems have mainly two drawbacks in that accuracy is poor and at least three signals from different base stations are required for trilateration or triangulation.

SUMMARY

The present disclosure provides a method and an apparatus for determining a position of user equipment. In one embodiment, by way of non-limiting example, a method for determining a position of user equipment, includes: receiving, by the user equipment, a signal from an external antenna, the signal being radiated in a cyclic pattern; measuring, by the user equipment, strength of the received signal; characterizing, by the user equipment, the measured strength to form a signal pattern over a time period; and determining, by the user equipment, a position of the user equipment based on the signal pattern.

In another embodiment, there is provided a method of radiating a signal in a cyclic pattern from an antenna for determining a position of user equipment, the method including: generating, by a control unit, control signals for actuating the antenna; and actuating, by an actuating unit, the antenna to radiate a signal in a cyclic pattern in response to the control signals, so that strength of the signal is characterized in a signal pattern over a time period by the user equipment.

In further another embodiment, there is provided an apparatus of determining a position of user equipment, the apparatus including: a processing unit being configured to: characterize strength of a signal radiated from an external antenna to the user equipment to form a signal pattern over a time period; and compute at least one of an angle and a distance of the user equipment with respect to the external antenna based on the signal pattern.

In still another embodiment, there is provided an antenna set for determining a position of user equipment, the antenna set including: an antenna configured to radiate a signal; a control unit configured to generate control signals for actuating the antenna; and an actuating unit configured to actuate the antenna that radiates the signal in a cyclic pattern in response to the control signals, so that strength of the signal is characterized in a signal pattern over a time period by the user equipment.

DETAILED DESCRIPTION

A detailed description may be provided with reference to the accompanying drawings. One of ordinary skill in the art may realize that the following description is illustrative only and is not in any way limiting. Other embodiments of the present disclosure may readily suggest themselves to such skilled persons having the benefit of this disclosure.

Figure 1:
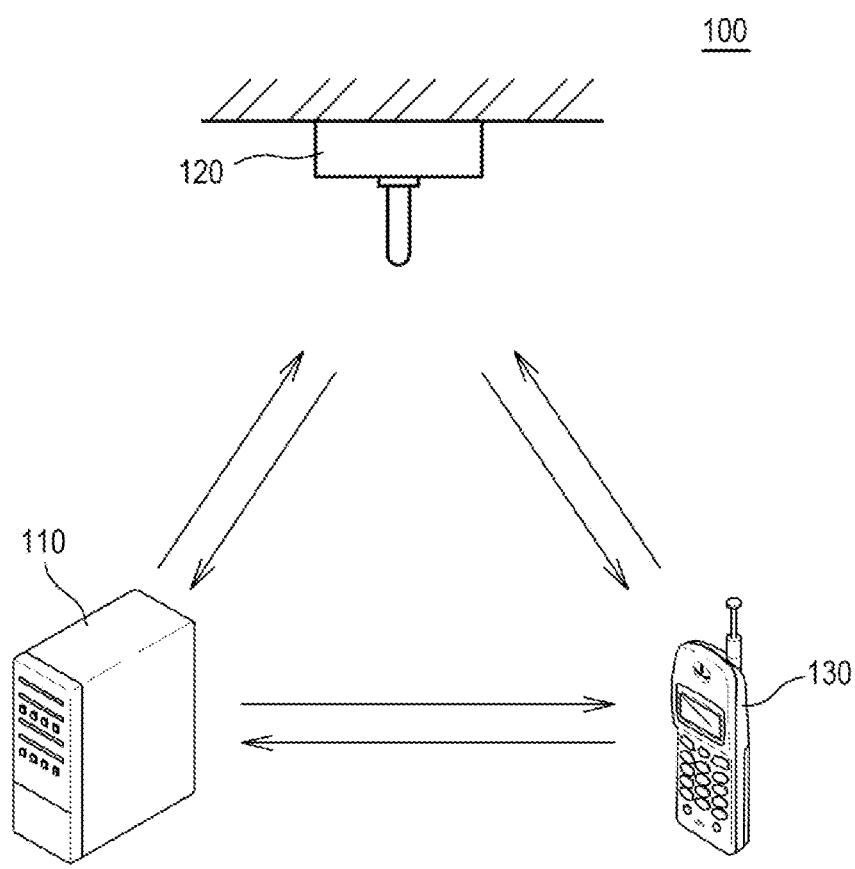
FIG. 1 illustrates a system in which a position of user equipment is determined according to one embodiment of the present disclosure.

FIG. 1 illustrates a positioning system 100 in which a position of user equipment is determined according to one embodiment of the present disclosure. As shown in FIG. 1, the positioning system 100 includes a positioning server 110, an antenna set 120 and user equipment 130. The positioning server 110 is configured to communicate with the antenna set 120 in a wired or wireless manner. Further, the positioning server 110 is configured to communicate with the user equipment 130 in a wireless or wired manner. The positioning server 110 may be one of a central station, a base station, a femto cell station, an access point (AP) and the like, but may not be limited thereto. The positioning system 100 may be applicable to a CDMA system, a GSM system, a WCDMA system, an LTE system, an LTE Advanced system, etc.

Figure 2:
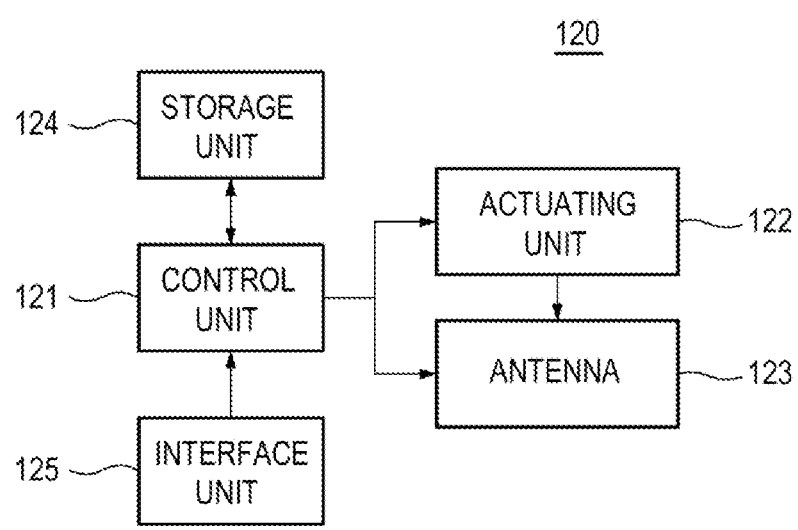
FIG. 2 is a block diagram of an antenna set according to one embodiment of the present disclosure.

FIG. 2 is a block diagram of the antenna set 120 according to one embodiment of the present disclosure. As shown in FIG. 2, the antenna set 120 includes a control unit 121, an actuating unit 122 and an antenna 123. The control unit 121 is configured to generate control signals based on operation parameters for actuating the antenna 123. The operation parameters include at least one of a rotating speed of the antenna 123, a rotating direction of the antenna 123, a quiescent time that the antenna 123 does not rotate, and a tilt angle of the antenna 123 and the like. Information on the operation parameters may be stored in a storage unit 124. In such a case, the control unit 121 is configured to access the storage unit 124 to generate the control signals. In another embodiment, the information on the operation parameters may be inputted through an interface unit 125 by a user. Further, the positioning server 110 is configured to communicate with the antenna set 120 to remotely set the operation parameters.

The actuating unit 122 is configured to actuate the antenna 123 in response to the control signals. In one embodiment, the actuating unit 122 includes a motor to rotate the antenna 123. Any type of motors capable of rotating the antenna 123, such as a step motor, etc., may be used. The actuating unit 122 is configured to rotate the antenna 123 in a specific cyclic rotation pattern, particularly in a clockwise direction and a counterclockwise direction alternately at a predetermined rotating speed, in response to the control signals. In such a case, one cycle in the cyclic pattern corresponds to rotating the antenna 123 by 360 degrees per one cycle in each of the clockwise direction and the counterclockwise direction. The actuating unit 122 is configured to stop the rotation of the antenna 123 for a predetermined period of time, i.e., the quiescent time, after each cycle or two cycles in response to the control signals.

In one embodiment, although it is described that the actuating unit is configured to rotate the antenna 123, it may not be limited thereto. In another embodiment, the antenna 123 is fixed to the antenna set 120 and the actuating unit 122 is configured to rotate the antenna set 120 in the specific cyclic pattern in response to the control signals.

In further another embodiment, the actuating unit 122 is configured to perform beam-forming with the antenna upon a signal to be radiated with being rotated in a clockwise direction and a counterclockwise direction alternately in a predetermined rotating speed in response to the control signals.

Any type of antenna capable of radiating a directional beam, such as a Yagi antenna and the like, may be employed as the antenna 123. The directional beam may be a beacon signal.

Figure 3:
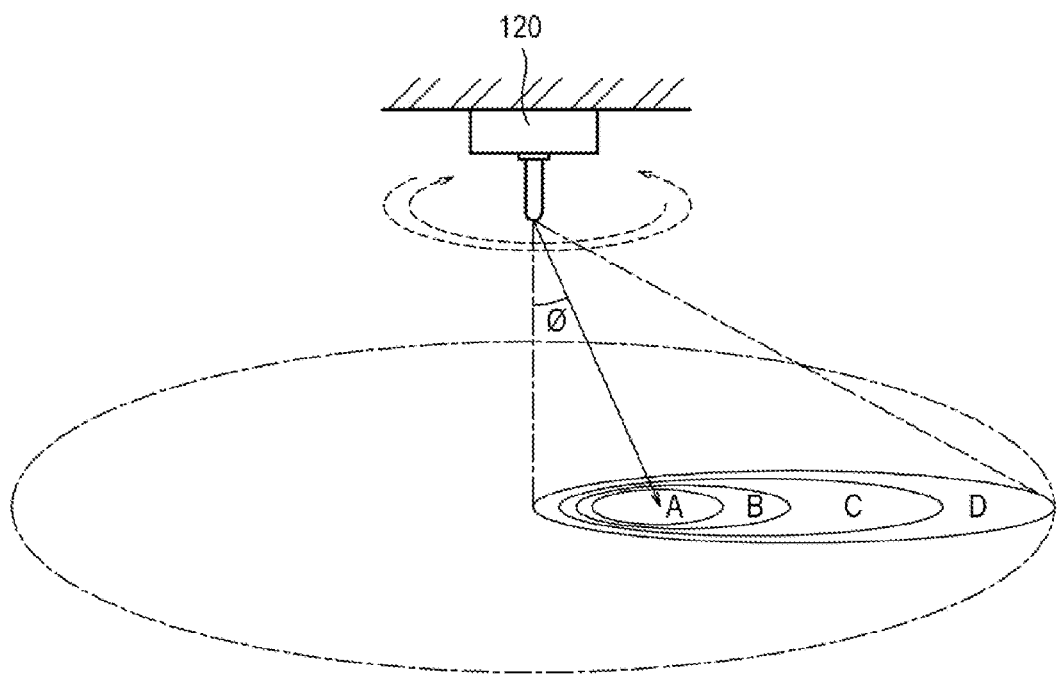
FIG. 3 is a diagram that illustrates radiating a cyclic beam from an antenna according to one embodiment of the present disclosure.

The antenna set 120 is installed at a relatively high location (e.g., a ceiling, etc.) by considering an indoor environment, so that the actuating unit 122 is further configured to tilt the antenna 123 at a predetermined tilt angle $\Phi$ in response to the control signals to incline a beam direction, as illustrated in FIG. 3. The tilt angle $\Phi$ is determined according to a floor height, an area to be covered by the corresponding antenna, etc. A symbol "A" denoted in FIG. 3 represents a center region of the directional beam, which may be radiated at a tilt angle $\Phi$, and symbols "B", "C" and "D" represent regions away from the center region A in an order of distance.

Figure 4:
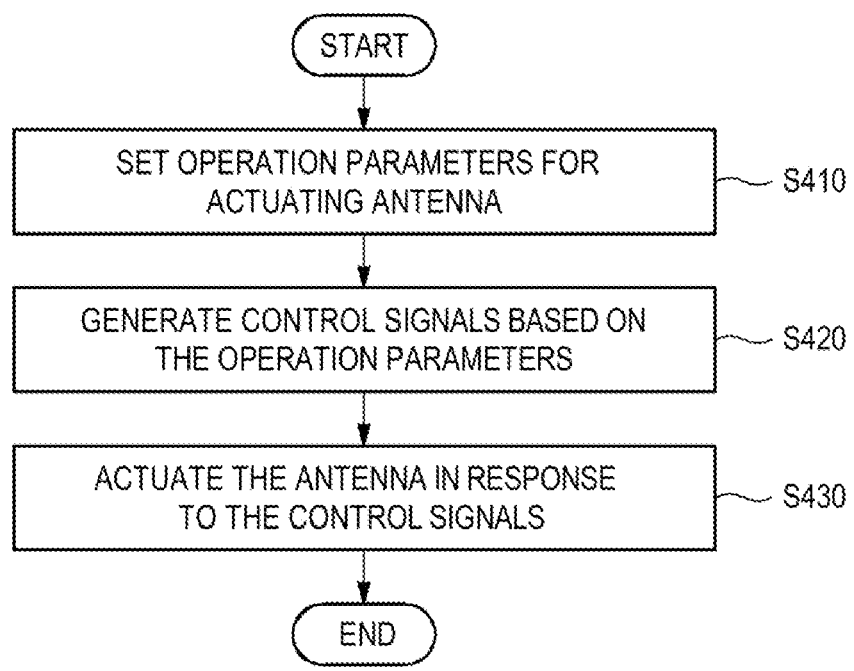
FIG. 4 is a flowchart illustrating a method for generating and radiating a signal by the antenna set according to one embodiment of the present disclosure.

FIG. 4 is a flowchart illustrating a method for generating and radiating a signal by the antenna set 120 according to one embodiment of the present disclosure. Referring to FIG. 4, the operation parameters, such as a rotation direction, a rotation speed, a tilt angle, a quiescent time and the like, for actuating the antenna 123, are set at S410. Thereafter, the control signals are generated based on the operation parameters for actuating the antenna 123 at S420. The antenna 123 is actuated to radiate a signal in a cyclic pattern that rotates in a clockwise direction and a counterclockwise direction alternately in response to the control signals at S430. In such a case, one cycle in the cyclic pattern corresponds to rotating the antenna 123 by 360 degrees per one cycle in each of the clockwise direction and the counterclockwise direction.

Figure 5:
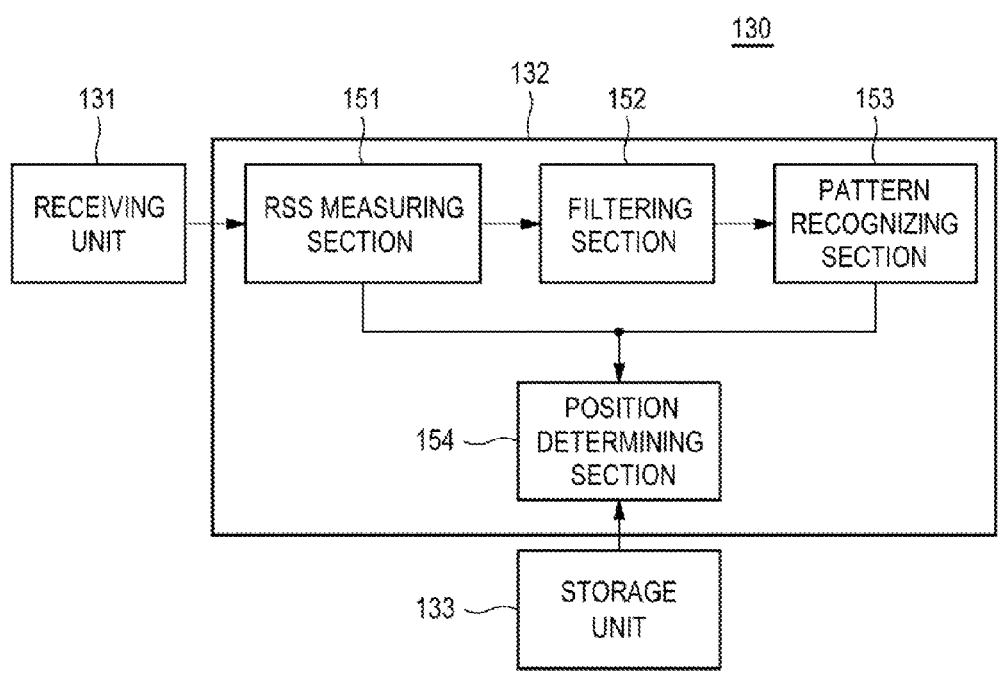
FIG. 5 is a block diagram of user equipment configured to communicate with an antenna set according to one embodiment of the present disclosure.

FIG. 5 is a block diagram of the user equipment 130 configured to communicate with the antenna set 120 according to one embodiment of the present disclosure. As shown in FIG. 5, the user equipment 130 includes a receiving unit 131 and a processing unit 132. The receiving unit 131 includes an antenna (not denoted) to receive the signal radiated from the antenna set 120. The receiving unit 131 of the user equipment 130 may be a part of a transceiver that may support a Code Division Multiple Access (CDMA) system, a Global System for Mobile Communications (GSM) system, Wideband CDMA (WCDMA) system, Long Term Evolution (LTE) system, LTE Advanced system, etc.

The processing unit 132 includes a received signal strength (RSS) measuring section 151, a filtering section 152, a pattern recognizing section 153 and a position determining section 154. The RSS measuring unit 151 is configured to measure strength of the received signal.

The filtering section 152 is configured to perform filtering upon the measured strength to reduce noises therefrom. Although it is described that the filtering unit 152 is included in the processing unit 132 in one embodiment of the present disclosure, the filtering unit 152 may be omitted if necessary.

The pattern recognizing section 153 is configured to characterize the strength of the received signal, which is measured by the RSS measuring section 151, to form a signal pattern of the received signal over a time period. The signal pattern may be the average strength of the received signal at respective times. The pattern recognizing section 153 is further configured to analyze the signal pattern to recognize pattern parameters. The pattern parameters include the maximum strength in the signal pattern.

Figure 7:
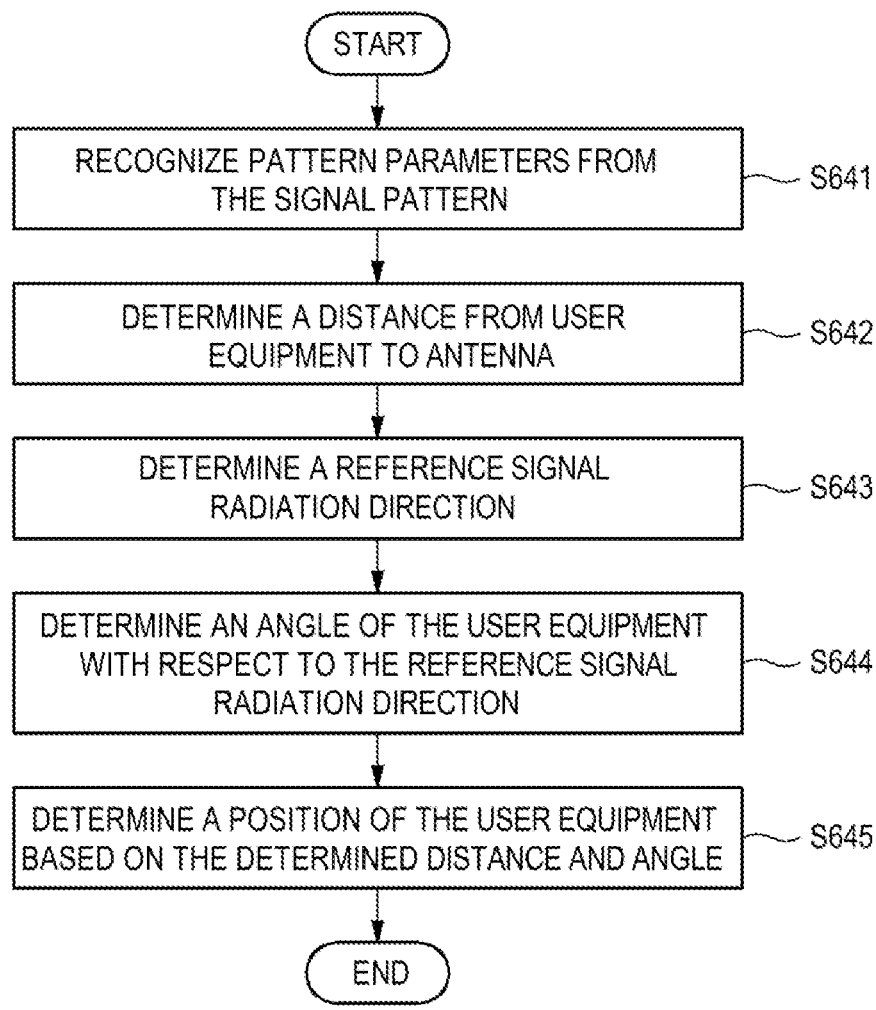
FIG. 7 is a flow chart illustrating a method for determining a position of user equipment based on a signal pattern according to one embodiment of the present disclosure.

The position determining section 154 is configured to compare the recognized maximum strength with reference strength of the signal radiated from the antenna 123. As shown in FIG. 7, the strength of the signal radiated from the antenna 123 may be attenuated as going away from the antenna 123 and its pattern will have a different wave form. Thus, the position determining section 154 is configured to determine a distance from the user equipment 130 to the antenna set 120 based on the strength attenuation computed by comparing the maximum strength and the reference strength.

The pattern parameters further include an average strength during the quiescent time, a minimum strength, a peak to peak time interval indicative of a time interval between two neighboring peaks, and the like. In one embodiment, a bottom to bottom time interval indicative of a time interval between two neighboring bottoms in the signal pattern may be used instead of the peak to peak time interval. The position determining section 154 is configured to determine an angle of the user equipment 130 with respect to a reference signal radiation direction of the antenna set 120 based on the pattern parameters. The determination of the angle of the user equipment 130 with respect to the reference signal radiation direction of the antenna set 120 will be described in detail below.

The processing unit 132 may be implemented with one or more processors, digital signal processors (DSPs), microprocessors, reduced instruction set computers (RISCs), etc. The processing unit 132 may also be fabricated on one or more application specific integrated circuits (ASICs) and/or some other type of integrated circuits (ICs).

The user equipment 130 further includes a storage unit 133. The storage unit 133 is configured to store information on a position of the antenna set 120. The storage unit 133 may store additional information on a plurality of reference quiescent times, each being associated with reference signal radiation directions, information on a plurality of reference peak to peak time intervals indicative of time intervals between two neighboring peaks within predetermined cycles, e.g., two cycles. The plurality of reference quiescent times has different time durations. The reference signal radiation direction may be indicated by azimuth, which is indicative of an angle between each of the reference signal radiation directions and a reference direction (e.g., north). The reference peak to peak time intervals are associated with respective angles with respect to the reference signal radiation direction. The storage unit 133 may include at least one of random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like.

The user equipment 130 may be a cellular phone, a smartphone, a terminal, a handset, a personal digital assistant (PDA), a wireless modem, a cordless phone, etc. The user equipment 130 may communicate directly with the other user equipment, e.g., using Wi-Fi Direct, Bluetooth, or FlashLinq technology.

Figure 6:
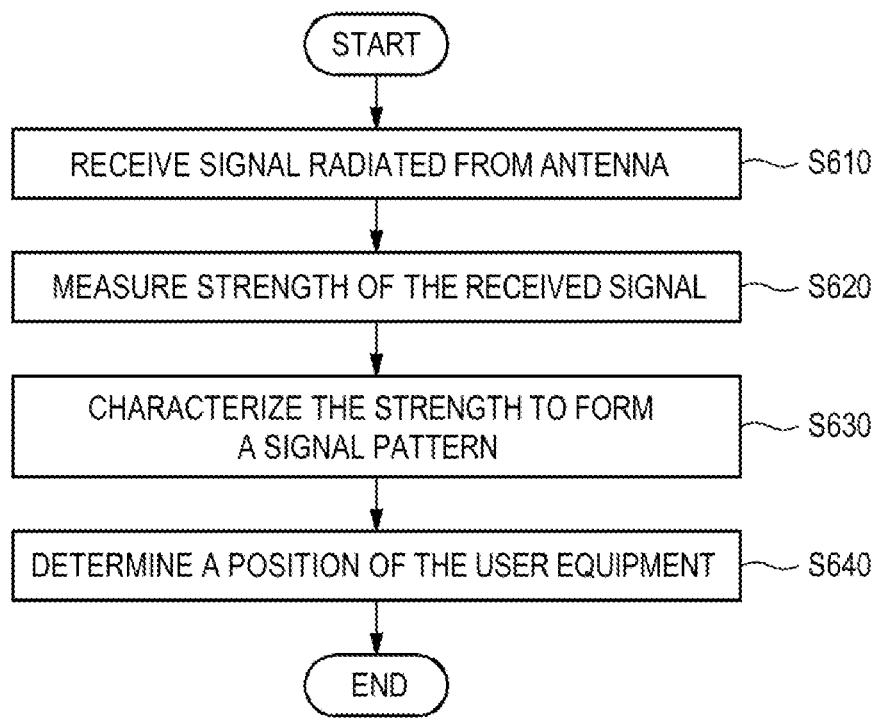
FIG. 6 is a flowchart illustrating a method for determining a position of user equipment according to one embodiment of the present disclosure.

Hereinafter, a procedure for determining a position of the user equipment 130 will be described by referring to FIGS. 6 to 10. FIG. 6 is a flowchart illustrating a method for determining a position of the user equipment 130 according to one embodiment of the present disclosure. Referring to FIG. 6, the signal radiated from the antenna 123 is received by the receiving unit 131 at S610. And then, the strength of the received signal is measured by the RSS measuring section 151 at S620. Filtering may be performed upon the strength to reduce noise therefrom. The strength of the received signal is characterized to form a signal pattern over a time period at S630. A position of the user equipment is determined based on the signal pattern at S640. The determination of the position of the user equipment 130 based on the signal pattern will be described in detail by referring to FIG. 7.

Figure 8:
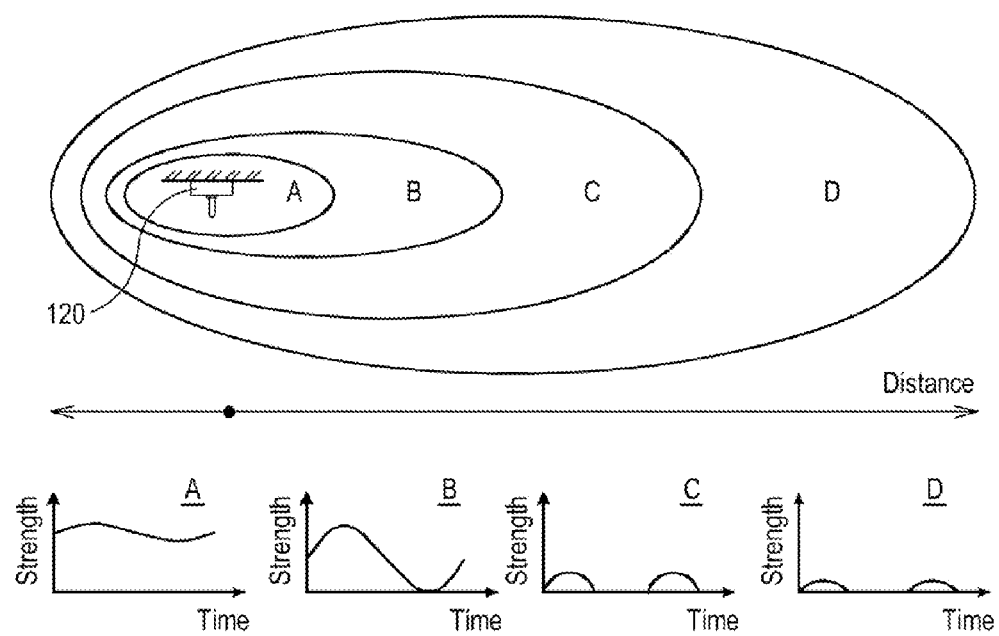
FIG. 8 is a diagram that illustrates signal patterns of a signal radiated from an antenna at a tilt angle Φ according to one embodiment of the present disclosure.

FIG. 7 is a flowchart illustrating a method for determining a position of the user equipment 130 based on the signal pattern. Pattern parameters are recognized from the signal pattern at S641. As shown in FIG. 8, the strength of the signal is relatively high at the A region and its pattern will appear in an almost flat wave. The signal pattern of the signal may appear in a sine wave at the B region. As going away from the antenna set 120, the strength of the signal will be attenuated and the signal pattern of the signal will appear in a clipped sine wave at C and D regions. The respective regions may appear in an ellipse shape due to the inclined beam radiation from the antenna set 120.

Figure 9:
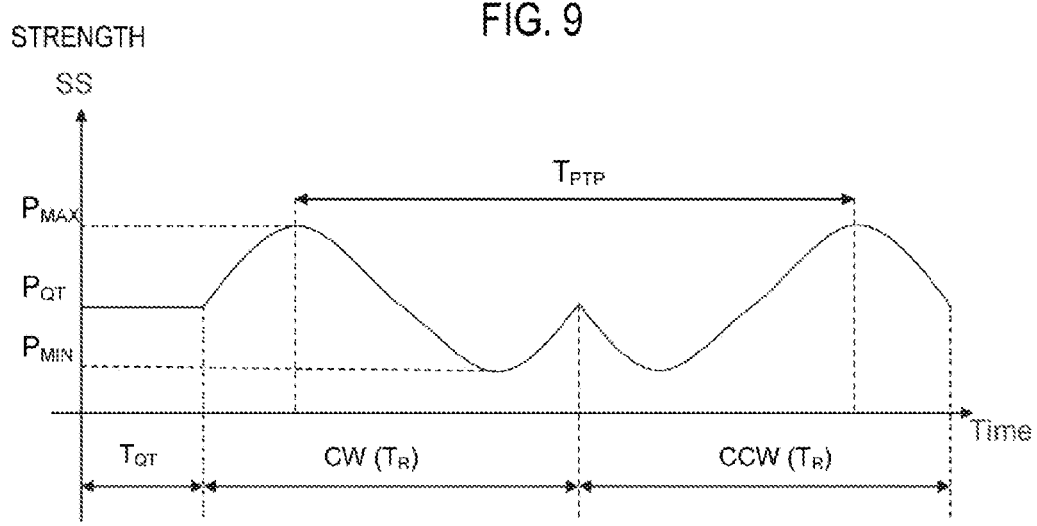
FIG. 9 is a diagram illustrating an example of a signal pattern of a signal received by user equipment at a certain location according to one embodiment of the present disclosure.

FIG. 9 is a diagram illustrating an example of a signal pattern of a signal received by the user equipment 130 at a certain location according to one embodiment of the present disclosure. As shown in FIG. 9, the signal pattern, which is characterized based on the measure strength by the RSS measuring section 141, may be a graph indicative of a strength change over a time period. In FIG. 9, a symbol $T_{QT}$ represents a quiescent time that is a time that the antenna 123 does not rotate, and a symbol $T_R$ represents a time that the antenna set 120 rotates a clockwise CW (or counterclockwise CCW) direction in one cycle. Hereinafter, the time $T_R$ will be referred to as a one cycle time $T_R$. A symbol $P_{QT}$ represents an average strength of the received signal during the quiescent time $T_{QT}$, a symbol $P_{MAX}$ represents a maximum strength of the received signal during two cycles, i.e., $2 \times T_R$, and a symbol $P_{MIN}$ represents a minimum strength of the received signal during two cycles, i.e., $2 \times T_R$.

In one embodiment, the quiescent time $T_{QT}$ is utilized to determine a reference signal radiation direction of the antenna 123. The reference signal radiation direction is predefined by a different quiescent time. Further, a symbol $T_{PTP}$ represents a time interval between two neighboring peaks during two cycles, i.e., $2 \times T_R$, which is, hereinafter, referred to as a peak to peak time interval. The average strength $P_{QT}$ and the peak to peak time interval $T_{PTP}$ are utilized to determine an angle of the user equipment 130 with respect to the reference signal radiation direction of the antenna 123.

The determining section 154 may access the storage unit 133 to access the reference strength and compare the maximum strength $P_{MAX}$ in the signal pattern with the reference strength to compute the strength attenuation of the received signal. The distance from the user equipment 130 to the antenna set 120 is determined based on the strength attenuation and the signal pattern at S642.

Figure 10:
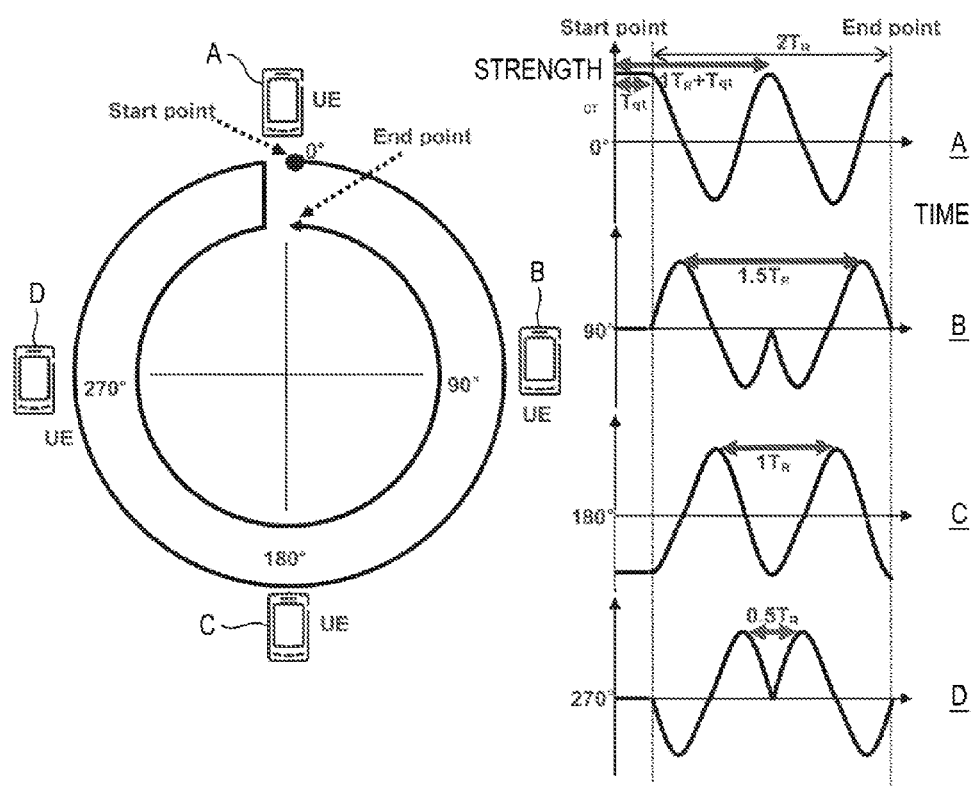
FIG. 10 is a diagram illustrating examples of signal patterns of the signal received by user equipment at different locations according to one embodiment of the present disclosure.

FIG. 10 is a diagram illustrating examples of signal patterns of the signal received by the user equipment 130 at different locations according to one embodiment of the present disclosure. If the antenna 123 rotates in a clockwise direction and a counterclockwise direction alternately by 360 degrees at each cycle with a predetermined quiescent time $T_{QT}$, signal patterns of the received signal differently appear at respective locations A, B, C and D of the user equipment 130, as shown in FIG. 10.

As described above, the antenna 123 does not rotate during the quiescent time $T_{QT}$, so that the average strength $P_{QT}$ may maintain in a constant level during the quiescent time $T_{QT}$. The pattern recognizing section 153 may recognize the quiescent time $T_{QT}$ by checking that the average strength $P_{QT}$ maintains at a constant level for a predetermined time. The positioning determining section 154 compares the recognized quiescent time $T_{QT}$ with the reference quiescent times stored in the storage unit 133, thereby determining the reference signal radiation direction at S643.

Referring to FIG. 10, when the user equipment 130 is located in an A region, i.e., the user equipment 130 is located at an angle of 0 degree with respect to the reference signal radiation direction, the average strength $P_{QT}$ during the quiescent time may become equal to the maximum strength $P_{MAX}$ and the peak to peak time interval $T_{PTP}$ will become equal to one cycle time $T_R$. When the user equipment 130 is located in a B region, i.e., the user equipment 130 is located at an angle of 90 degrees with respect to the reference signal radiation direction, the average strength $P_{QT}$ during the quiescent time may become almost a middle value between the maximum strength $P_{MAX}$ and the minimum strength $P_{MIN}$ and the peak to peak time interval $T_{PTP}$ will become the one and a half cycle time $T_R$, i.e., 1.5 $T_R$.

Further, when the user equipment 130 is located in a C region, i.e., the user equipment 130 is located at an angle of 180 degrees with respect to the reference signal radiation direction, the average strength $P_{QT}$ during the quiescent time will become equal to the minimum strength $P_{MIN}$ and the peak to peak time $T_{PTP}$ will become equal to the one cycle time $T_R$. When the user equipment 130 is located in a D region, i.e., the user equipment 130 is located at an angle of 270 degrees with respect to the reference signal radiation direction, the average strength $P_{QT}$ during the quiescent time may become almost a middle value between the maximum strength $P_{MAX}$ and the minimum strength $P_{MIN}$ and the peak to peak time interval $T_{PTP}$ will become a half of the one cycle time $T_R$, i.e., 0.5 $T_R$.

The pattern recognizing section 153 recognizes the peak to peak time interval $T_{PTP}$, from the signal pattern. The determining section 154 compares the recognized peak to peak time interval $T_{PTP}$ with the reference peak to peak time intervals stored in the storage unit 133 to select one among the reference peak to peak time intervals. The determining section 154 determines an angle of the user equipment 130 with respect to the reference signal radiation direction of the antenna set 120 based on the selected reference peak to peak time interval and the average strength $P_{QT}$ at S644.

The processing unit 132 determines a position of the user equipment 130 based on the distance from the user equipment to the antenna set 120, and the angle of the user equipment 130 with respect to the reference signal radiation direction at S645.

As described above, average strength $P_{QT}$ of the received signal for the quiescent time $T_{QT}$ varies according to the respective locations of the user equipment 130 and the peak to peak time $T_{PTP}$ can be also characterized according to the respective locations of the user equipment 130. Thus, an angle of the user equipment 130 to the antenna set 120 is accurately estimated by using the quiescent time $T_{QT}$, the average strength $P_{QT}$ during the quiescent time and the peak to peak time $T_{PTP}$ according to one embodiment of the present disclosure.

In the meantime, the storage unit 133 is further configured to store a plurality of reference signal pattern models associated with respective angles with respect to the reference signal radiation direction according to another embodiment. The position determining section 154 is configured to compare the signal pattern with the reference signal pattern models stored in the storage unit 133. The position determining section 154 selects a most similar reference signal pattern model, thereby determining an angle of the user equipment with respect to the reference signal radiation direction.

Although it is described in the above embodiment that the pattern recognizing section 153 and the determining section 154 are included in the user equipment 130, it may not be limited thereto. In another embodiment, the determining section 154 or the pattern recognizing section 153 and the determining section 154 may be installed on the positioning server 110.

Figure 11:
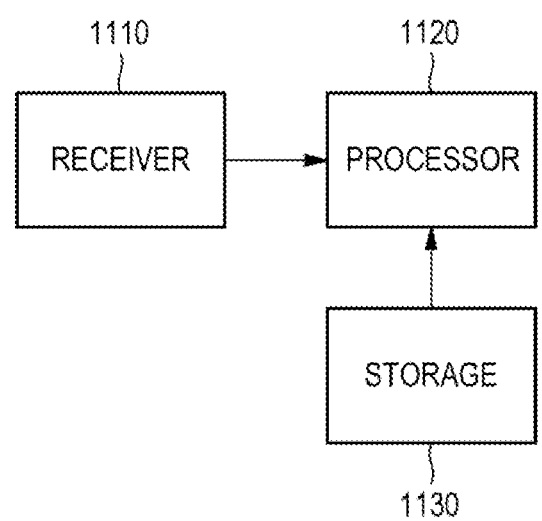
FIG. 11 is a block diagram of a positioning server configured to communicate with user equipment according to one embodiment of the present disclosure.

FIG. 11 is a block diagram of a part of the positioning server 110 configured to communicate with the user equipment 130 according to one embodiment of the present disclosure. Referring to FIG. 11, the positioning server 110 may include a receiver 1110 configured to receive from the user equipment 130 information on the signal pattern, which is characterized by the pattern recognizing section 153 of the user equipment 130.

The positioning server 110 may further include a processor 1120 configured to recognize the maximum strength from the signal pattern, which are received from the user equipment 130, and compare the recognized maximum strength with reference strength radiated from the antenna 123 to compute strength attenuation. The processor 1120 may be configured to determine a distance from the user equipment 130 to the antenna set 120 based on the strength attenuation.

The processor 1120 may be further configured to recognize the quiescent time $T_{QT}$, the average strength $P_{QT}$ at the quiescent time $T_{QT}$, the minimum strength, the peak to peak time interval, and the like.

The positioning server 110 may further include a storage 1130 configured to store information on at least one of a position of the antenna set 120. The storage 1130 may store information on quiescent times of different time duration, each being associated with the reference signal radiation direction, information on angles associated with peak to peak time intervals. The storage unit 133 may include at least one of random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like.

The processor 1120 compares the recognized quiescent time with the reference quiescent times stored in the storage 1030, thereby determining the reference signal radiation direction. The processor 1020 may compare the recognized peak to peak time interval $T_{PTP}$ with the reference peak to peak time intervals stored in the storage, thereby selecting one among the reference peak to peak time intervals. The processor 1120 determines an angle of the user equipment 130 with respect to the reference signal radiation direction based on the average strength $P_{QT}$ at the quiescent time $T_{QT}$ and the selected reference peak to peak time interval. Finally, the processor 1120 determines a position of the user equipment 130 based on the distance from the user equipment to the antenna set 120, and the angle of the user equipment 130 with respect to the reference signal radiation direction.

Although it is described in above embodiment that the positioning server 110 receives from the user equipment 130 the signal pattern, which is characterized by the user equipment 130, the position server 100 receives information on strength, which is measured by the RSS measuring section 151 of the user equipment 130, according to another embodiment of the present disclosure. In such a case, the processor 1120 characterizes the strength to form a signal pattern.

In further another embodiment, the information on strength, which is measured by the RSS measuring section 151 of the user equipment 130, is transmitted to the positioning server 110 via the antenna set 120. Also, the information on the signal pattern, which is formed by the pattern recognizing section 153, is transmitted to the positioning server 110 via the antenna set 120.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks and units described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as RAM, ROM, NVRAM, PROM, EEPROM, FLASH memory, CD, magnetic or optical data storage device, or the like. The instructions may be executable by one or more processors and may cause the processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a user equipment for determining a position of the user equipment, comprising:
    receiving, by the user equipment, a signal from an external antenna, the signal being radiated in a cyclic pattern, wherein the signal is radiated in a clockwise direction and a counterclockwise direction alternately;
    measuring, by the user equipment, a strength of the received signal;
    characterizing, by the user equipment, the measured strength to form a signal pattern over a time period;
    analyzing, by the user equipment, the signal pattern to recognize pattern parameters, wherein the pattern parameters include:
        a peak to peak time interval indicative of a time interval between two neighboring peaks in the signal pattern,
        a quiescent time at which the measured strength maintains in a constant level for a predetermined time, and
        a maximum strength in the signal pattern; and
    determining, by the user equipment, a position of the user equipment based on the signal pattern.

2. The method of claim 1, further comprising:
    storing information on a plurality of reference quiescent times associated with respective reference signal radiation directions of the external antenna; and
    storing information on a plurality of reference peak to peak time intervals associated with respective angles with respect to the reference signal radiation direction of the external antenna in the user equipment.

3. The method of claim 2, wherein the analyzing includes recognizing a quiescent time from the signal pattern, and wherein the determining includes comparing the recognized quiescent time with the reference quiescent times to determine the reference signal radiation direction.

4. The method of claim 3, wherein the analyzing includes recognizing a peak to peak time interval from the signal pattern, and wherein the determining includes:
    comparing the recognized peak to peak time interval with the reference peak to peak time intervals to select one among the reference time intervals; and
    determining an angle of the user equipment with respect to the reference signal radiation direction based on the selected reference time interval and the signal pattern at the quiescent time.

5. The method of claim 4, further comprising storing information of reference strength of the signal radiated from the external antenna in the user equipment,
    wherein the analyzing includes recognizing maximum strength from the signal pattern, and
    wherein the determining includes comparing the maximum strength with the reference strength to determine a distance from the user equipment to the external antenna.

6. The method of claim 1, further comprising storing a plurality of reference signal pattern models associated with respective angles with respect to the reference signal radiation direction in the user equipment, wherein the determining includes:
    comparing the signal pattern with the reference signal pattern models to select a most similar reference signal pattern model; and
    determining an angle of the user equipment with respect to the reference signal radiation direction based on the selected reference signal pattern model.

7. An apparatus of a user equipment for determining a position of the user equipment, comprising:

a processing unit being configured to:
measure a strength of a signal received by the user equipment that is radiated from an external antenna, wherein the signal is radiated from the external antenna in a cyclic pattern that rotates in a clockwise direction and a counterclockwise direction alternately;
characterize the strength of the signal radiated from the external antenna to the user equipment to form a signal pattern over a time period;
analyze the signal pattern to recognize pattern parameters, wherein the pattern parameters include:
a quiescent time at which signal pattern maintains in a constant level for a predetermined time;
a peak to peak time interval indicative of a time interval between two neighboring peaks in the signal pattern within a predetermined cycle; and
a maximum strength in the signal pattern; and
compute at least one of an angle and a distance of the user equipment with respect to the external antenna based on the signal pattern.

8. The apparatus of claim 7, wherein the processing unit is further configured to determine a position of the user equipment based on the computed angle and distance.

9. The apparatus of claim 7, further comprising a storage unit configured to store:
information on a plurality of reference quiescent times associated with respective reference signal radiation directions of the external antenna; and
information on a plurality of reference peak to peak time intervals associated with respective angles with respect to the reference signal radiation direction of the external antenna.

10. The apparatus of claim 9, wherein the processing unit is configured to recognize a quiescent time from the signal pattern, and compare the recognized quiescent time with the reference quiescent times to determine the reference signal radiation direction,
the processing unit being further configured to
recognize a peak to peak time interval from the signal pattern,
compare the recognized peak to peak time interval with the reference peak to peak time intervals to select one among the reference peak to peak time intervals, and
determine the angle of the user equipment with respect to the reference signal radiation direction based on the selected reference peak to peak time interval and the signal pattern at the quiescent time.

11. The apparatus of claim 9, wherein:
the storage unit is configured to store information of reference strength of the signal radiated from the external antenna; and
the processing unit is configured to recognize maximum strength from the signal pattern, and to compare the maximum strength with the reference strength to determine the distance from the user equipment to the external antenna.

12. The apparatus of claim 8, further comprising a storage unit configured to store a plurality of reference signal pattern models associated with respective angles with respect to the reference signal radiation direction,
wherein the processing unit is configured to
compare the signal pattern with the reference signal pattern models to select a most similar reference signal pattern model, and
determine the angle of the user equipment with respect to the reference signal radiation direction based on the selected reference signal pattern model.

* * * * *